United States Patent
Binder et al.

(10) Patent No.: US 6,471,755 B2
(45) Date of Patent: Oct. 29, 2002

(54) GAS CONDUCTING SYSTEM WITH FILTER FOR MOISTURE REMOVAL

(75) Inventors: Walter Binder, Backnang (DE); Markus Kolczyk, Besigheim (DE); Christian Fischer, Fellbach (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/925,027

(22) Filed: Aug. 9, 2001

(65) Prior Publication Data

US 2002/0035926 A1 Mar. 28, 2002

(30) Foreign Application Priority Data

Aug. 9, 2000 (DE) .......................... 100 39 631

(51) Int. Cl.[7] ................................. B01D 53/26
(52) U.S. Cl. .................. 96/147; 55/502; 55/DIG. 17; 277/644
(58) Field of Search .................. 96/108, 147, 151; 55/385.3, 502, DIG. 17; 210/450, DIG. 17; 277/644

(56) References Cited

U.S. PATENT DOCUMENTS

| 4,473,471 A | * | 9/1984 | Robichaud et al. ......... 210/443 |
| 5,066,318 A | * | 11/1991 | McDonough ................. 55/302 |
| 5,522,150 A | * | 6/1996 | Schultz ........................... 34/80 |
| 5,525,226 A | * | 6/1996 | Brown et al. ................ 210/443 |
| 5,545,242 A | * | 8/1996 | Whitlock et al. ........... 210/435 |
| 5,779,772 A | * | 7/1998 | Unger et al. ........... 55/DIG. 17 |
| 6,076,272 A | * | 6/2000 | Conklin et al. ................ 34/80 |
| 6,306,298 B1 | * | 10/2001 | Diemer ....................... 210/232 |

FOREIGN PATENT DOCUMENTS

| DE | 196 50 185 | | 6/1998 |
| EP | 1048541 A1 | * | 11/2000 |

* cited by examiner

Primary Examiner—David A. Simmons
Assistant Examiner—Frank M. Lawrence
(74) Attorney, Agent, or Firm—Crowell & Moring LLP

(57) ABSTRACT

A gas conducting system, particularly a compressed air system for a motor vehicle, which includes a filter containing a desiccant for removing moisture from a gas passed therethrough. The housing structure of the filter is provided with a seal with a weakened area 18, which specifically causes any overpressure to be reduced through failure of the weakened area if the pressure inside exceeds a permissible maximum. This process can be repeated multiple times until the seal with the weakened area 18 must be replaced due to aging. The weakened area can be used as a substitute for a pressure relief valve or as supplemental protection in case the pressure control valve fails, e.g., due to ice. This can prevent, for instance, bursting of the filter housing which could present a safety risk.

11 Claims, 2 Drawing Sheets

GAS CONDUCTING SYSTEM WITH FILTER FOR MOISTURE REMOVAL

BACKGROUND OF THE INVENTION

The invention relates to a gas conducting system, which can be used particularly as a pressurized air system for motor vehicles and is provided with a filter for moisture removal. The invention further relates to a filter containing a desiccant.

Filters containing desiccants are known. DE 196 50 185 discloses a replaceable cartridge in the form of an air dryer fixed in the mounting location by a screw-on cover, which makes it possible for the gas that has to be dried to flow through. These filters, which are referred to as a desiccant boxes, are used for instance in air brake systems of trucks and buses for removing moisture the compressor air to prevent corrosion and icing up of the brake system.

At very low temperatures and under unfavorable operating conditions, however, the control valve for the compressor in the brake system may freeze. Consequently, an unacceptably high pressure builds up and may cause the brake system to fail. In this case, the housing of the desiccant box is at risk since it is usually the weakest part in the gas conducting system. An explosion of the housing presents an enormous safety risk, which affects not only the function of the motor vehicle but may jeopardize the health of the passengers.

SUMMARY OF THE INVENTION

It is therefore the object of the invention to provide a filter for removing moisture for air in an air conducting system.

Another object of the invention is to provide a moisture removing filter which is not subject to bursting if subjected to excessive internal air pressures.

A further object of the invention is to provide a moisture removing filter which is protected against bursting under excessive pressure and yet can be manufactured at reasonable cost.

These and other objects are achieved in accordance with the present invention by providing a gas conducting system which includes a filter for removing moisture from a gas passed therethrough, in which the filter is provided with a desiccant arranged in a filter housing structure having an inlet and an outlet for the gas to flow through, and in which the housing structure is provided with a seal which seals the housing relative to the surrounding environment of the gas conducting system, and the seal comprises at least one weakened area with a lower pressure limit for failure than the rest of the seal.

In accordance with a further aspect of the invention, the objects are achieved by providing a moisture removing filter comprising a desiccant arranged in a housing structure, the filter having a seal for sealing the housing structure relative to the surrounding environment of the housing structure, in which the seal comprises at least one weakened area with a lower pressure limit for failure than the rest of the seal.

The gas conducting system according to the invention comprises a filter with a housing structure, which is made tight against the environment of the gas conducting system by means of a seal. The seal is thus provided between the housing structures containing the duct system for the gas from which moisture is to be removed and the environment. The housing structure can be a separate housing for the filter or form an integral component of the gas conducting system.

In the latter case, it is possible, for instance, to design the housing structure in such a way that it can be opened to replace the desiccant.

The invention is characterized in that the seal has at least one weakened area designed to fail at a lower limit pressure than the remainder of the seal. This weakened area is designed as a predetermined weak point for targeted failure of the seal. Failure of the seal occurs in a pressure range that lies outside the normal operating range of the gas conducting system but is below the critical pressures for the housing structure of the filter. This effectively counteracts an explosive failure of the housing structure and thereby enhances the safety of the component.

In accordance with a further embodiment of the invention, the filter may be designed as a disposable filter. In this case, the desiccant in the filter cannot be replaced. To renew the desiccant, the entire disposable filter must be replaced. The described configuration as a disposable filter makes it possible to create particularly cost-effective and safe filter systems.

In another variant of the invention, the housing structure of the filter can be opened and the desiccant replaced. The possibility of replacing the desiccant in this embodiment minimizes waste. The housing can be reused so that only the insert with the desiccant has to be disposed of in some manner. This is a solution that is environmentally sound and also economical over prolonged operation.

In accordance with one specific embodiment of the invention, the weakened area of the seal, which is designed as a predetermined weak point, is formed by a cross section that is reduced compared to the rest of the seal. The geometry of the cross-sectional reduction is selected in such away that under normal operating pressures a seal is produced even at the point of the weakened area. Only an excessive increase in the operating pressure causes the weakened area to fail. The permissible operating pressure can be exceeded multiple times if the seal is designed accordingly. As soon as the operating pressure drops again to the permissible range, the sealing function of the seal is completely restored.

As an alternative to a cross-sectional reduction, a different sealing material can be selected to produce the weakened area. In this case, the sealing ring can be produced by a two-component molding technique.

In accordance with another specific embodiment of the invention, the seal with the weakened area is provided between the housing structure containing the desiccant and the mounting location on the gas conducting system. This is a housing structure that can be removed from the gas conducting system. The seal required at this location can advantageously be equipped with the described predetermined weak point without causing any additional design complexity. At the same time, this creates a good opportunity at the mounting location to replace the seal and thereby to prevent loss of function due to aging.

Advantageously, the seal can be fixed in a recess in the mounting location. When the housing structure is removed, the seal thus remains, for instance, in a groove in the mounting location. The seal can of course also be fixed to a device on the housing structure that is specially provided for this purpose so that it remains on the housing structure when the housing structure is disassembled.

Another option is to arrange the seal between two different housing parts of the housing structure. If these housing parts are designed so that they can be opened for desiccant replacement, the weakened area can be accommodated in the seal between the housing parts, which seal is required in any case. This does not create any additional design complexity.

One particular embodiment of the invention provides that the weakened area be made of a material having essentially constant sealing properties within a temperature range specified for the gas conducting system. Venting through the weakened area of the seal can then be achieved independently of the momentary operating temperature. This makes it possible, for instance, to eliminate a pressure control valve in the gas conducting system, which increases the economic efficiency of the entire system.

In a case like that described above in which the seal has to be used only if the pressure control valve ices up, the requirements for constant sealing properties are lower. The limit pressure at which the seal will start to leak has to be ensured only for the temperature range where there is a risk of icing, provided that this pressure increases with increasing temperatures. At higher temperatures, the functioning of the pressure control valve is assured, so that there is no need for the weakened area of the seal to be opened.

The invention furthermore comprises a filter with a housing structure, which has a seal with the previously described properties to seal the housing structure relative to its surrounding environment. This filter can be used, in particular, in a gas conducting system of the described type, such as an air brake system.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawings in which.

DETAILED DESCRIPTION OF PREFERRED EMBODIMENTS

Figure 1:
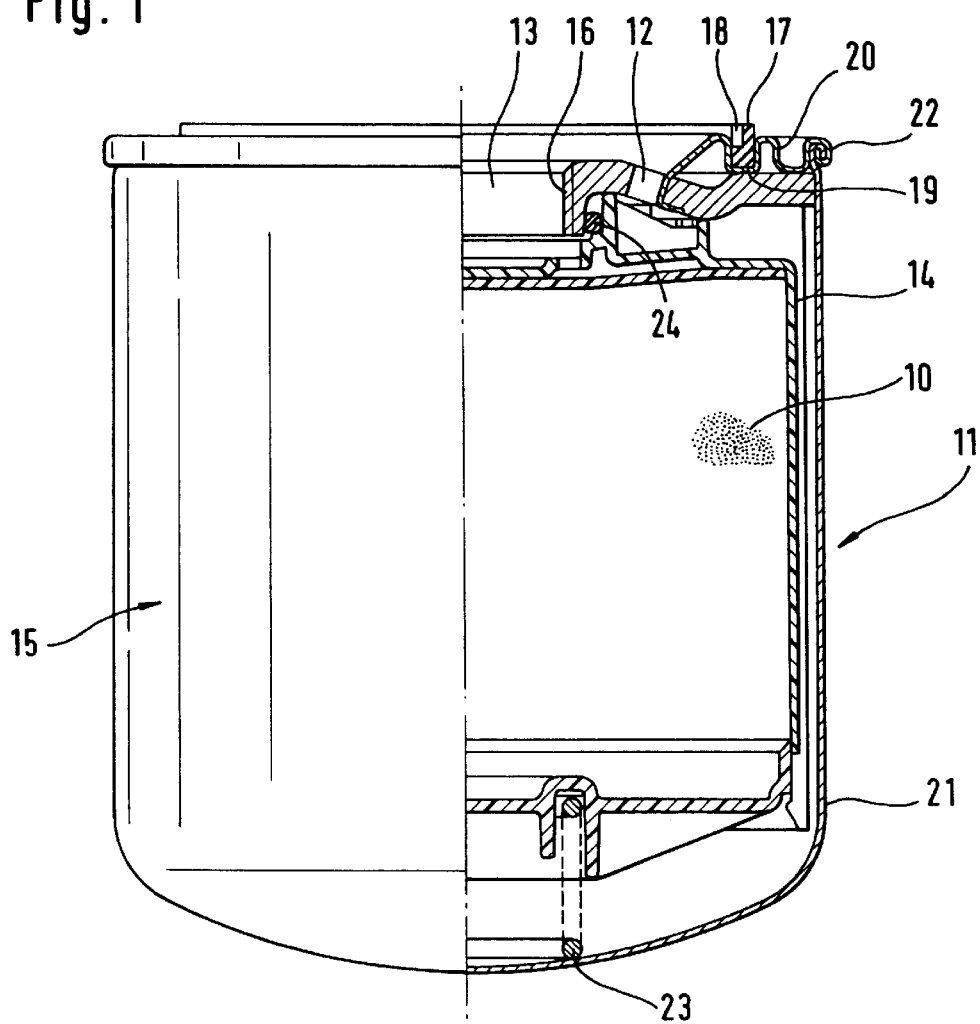
FIG. 1 is a partial sectional view through the center of a filter according to the invention.

FIG. 1 shows a filter 11 filled with a desiccant 10. The filter has an inlet 12 and an outlet 13. The flow of a gas (e.g., air) to be dried is indicated by arrows. The desiccant is disposed in a filter element 14, which is mounted in a sealing manner inside a housing structure 15.

The filter shown in FIG. 1 is designed as a disposable filter. The filter element with the desiccant 10 cannot be replaced. The filter is provided with a central thread 16 so that it can be screwed to the mounting location of the gas conducting structure (not shown), e.g., the air brake system of a truck. A seal between filter 11 and the mounting location is produced by a sealing element 17, which is provided with a weakened area 18.

The weakened area 18 comprises a cutout in the profile of the sealing ring, so that the sealing ring ensures a seal at the pressures within the operating range of the filter. The weakened area fails only if the gas pressure against the seal increases to an impermissible extent, because the seal offers less resistance against the pressure in the weakened area than in the remaining area. By modifying the weakened area, the venting of excess pressure through the sealing ring can be precisely adjusted. By appropriately configuring the weakened area, the venting pressure can be relatively exactly maintained even if there are tolerances in the sealing area.

The sealing ring is received in a groove 19, which is integrated into a cover plate 20. The cover plate is permanently connected with a pot-type housing 21 by crimping 22. As an alternative (not shown) the sealing ring can also be fixed in a grove in the mounting location. In this case, the housing would not be provided with a groove but with a flattened area that is necessary as an opposing surface for the sealing ring.

Other components of the filter include a spring 23 and an O-ring 24, which serve to fix the filter element within the housing and to provide a seal between the unfiltered and the filtered side of the filter element.

Figure 2:
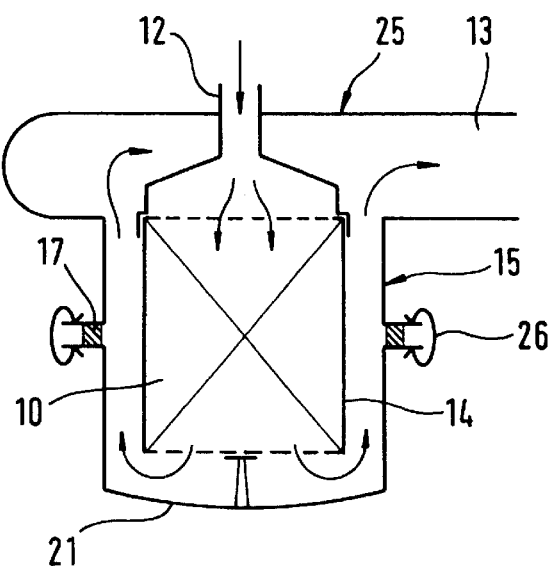
FIG. 2 is an alternative embodiment of the filter in which the housing structure is screwed onto the gas conducting system as shown in detail X of FIG. 1.

FIG. 2 is a schematic detail illustration of a portion of a gas conducting system 25. The one half of the housing structure 15, which is comprised by the pot-type housing 21, is part of the gas conducting system. The figure also outlines the filter element 14, which is mounted within the housing structure. Arrows show the flow through the gas conducting system 25 and the filter.

In this embodiment, the sealing ring 17 with the weakened area (not shown) serves as a seal between the separable parts of housing 21. The parts are held together by assembly clamps or brackets 26, which simultaneously produce the sealing pressure on the seal 17. These assembly brackets can be removed to enable housing 21 to be opened so that the filter element 14 can be replaced when this becomes necessary due to aging of the desiccant 10.

Figure 3:
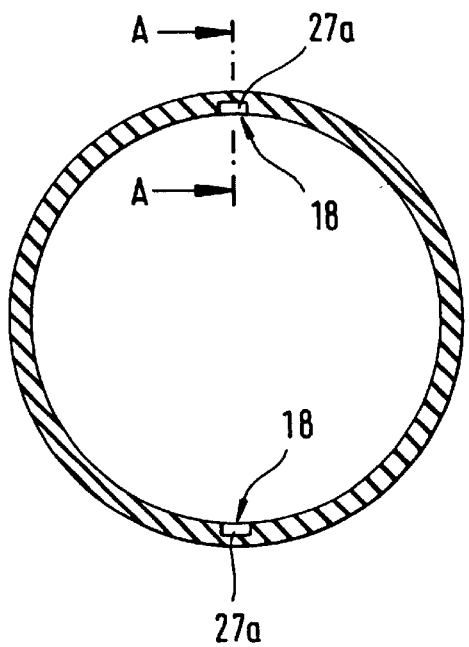
FIG. 3 is a top view of a seal with two weakened areas.

FIG. 3 shows an example of the design of seal 17. The seal has two cutouts 27a on opposite sides, which serve as weakened areas 18.

Figure 4:
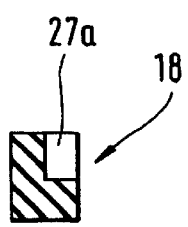
FIG. 4 is a section taken along section line A—A of FIG. 1.
Figure 5:
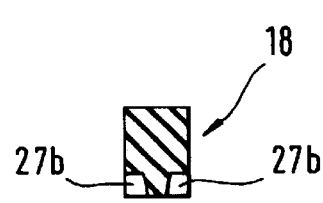
FIG. 5 is a depiction of an alternative profile for the weakened area.
Figure 6:
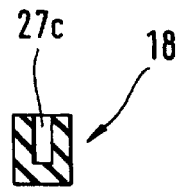
FIG. 6 shows an additional profile for the weakened area.

The cross-sectional profile of the seal is shown in FIG. 4. It is substantially rectangular. The rectangular cutout 27a is arranged only in the weakened area 18. Alternatively, cutouts 27b can be disposed on both sides of the sealing ring as illustrated in FIG. 5. Another possible variant is a U-shaped configuration of the sealing profile in the weakened area 18 by a corresponding cutout 27c as illustrated in FIG. 6.

Figure 7:
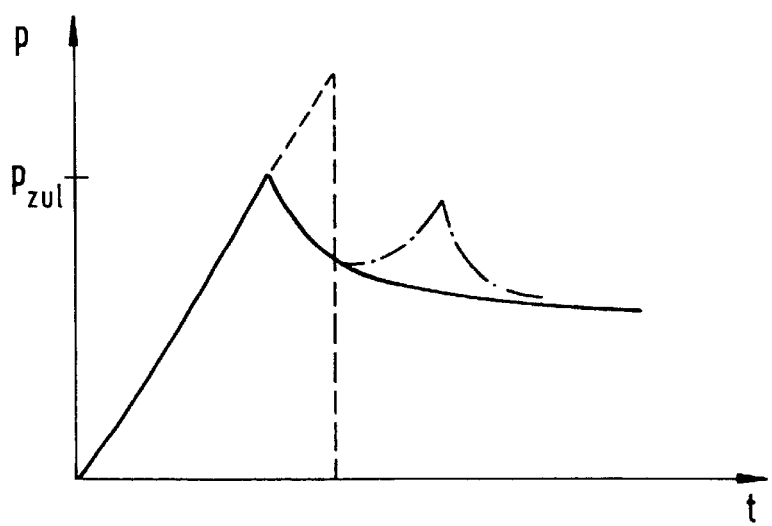
FIG. 7 shows different pressure curves over time with the use of the sealing ring with the weakened area.

FIG. 7 shows a typical pressure curve of the described seals when used in a desiccant box for the brake system of a truck. The diagram plots the course of the pressure p over time t. As shown by the solid line curve, if the pressure increases above a certain permissible value $P_{zul}$, the weakened area fails, so that gas escapes and the pressure drops. This process can be repeated as shown by the dash-dot broken line curve, although a somewhat lower opening pressure may develop over time through fatigue in the weakened area. Finally, the dashed line in the figure shows the pressure curve resulting from a prior art sealing ring without a weakened area, which would lead to an abrupt pressure drop through bursting of the housing structure.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. A moisture removing filter comprising a desiccant arranged in a housing structure, said filter having a seal for sealing the housing structure relative to the surrounding environment of the housing structure, wherein said seal comprises at least one weakened area with a lower pressure limit for failure than the rest of the seal.

2. A filter according to claim 1, wherein the filter housing has an inlet and an outlet for connection to a gas conducting system.

3. A gas conducting system which includes a filter for removing moisture from a gas passed therethrough, wherein said filter is provided with a desiccant arranged in a filter housing structure having an inlet and an outlet for the gas to flow through, and wherein the housing structure is provided with a seal which seals the housing relative to the surrounding environment of the gas conducting system, said seal comprising at least one weakened area with a lower pressure limit for failure than the rest of the seal.

4. A gas conducting system according to claim 3, wherein the moisture removing filter is a disposable filter in which the desiccant cannot be replaced.

5. A gas conducting system according to claim 3, wherein the housing structure of the filter can be opened and the desiccant can be replaced.

6. A gas conducting system according to claim 3, wherein the weakened area of the seal is formed by a reduced cross section compared to the rest of the seal.

7. A gas conducting system according to claim 3, wherein the seal with the weakened area is provided between the filter housing structure and a mounting location for the filter on the gas conducting system.

8. A gas conducting system according to claim 7, wherein the seal is fixed in a recess at the mounting location.

9. A gas conducting system according to claim 3, wherein the seal with the weakened area is provided between two housing parts of the filter housing structure.

10. A gas conducting system according to claim 3, wherein the seal with the weakened area is made of a material that has substantially constant sealing properties within an operating temperature range specified for the gas conducting system.

11. A gas conducting system according to claim 3, wherein said gas conducting system is a compressed air brake system of a motor vehicle.

* * * * *